(12) United States Patent
Rouesne

(10) Patent No.: US 9,279,449 B2
(45) Date of Patent: Mar. 8, 2016

(54) DEVICE FOR CENTERING AND GUIDING THE ROTATION OF A TURBOMACHINE SHAFT

(75) Inventor: Ivan Guy Rouesne, Combs la Ville (FR)

(73) Assignee: SNECMA, Paris (FR)

( * ) Notice: Subject to any disclaimer, the term of this patent is extended or adjusted under 35 U.S.C. 154(b) by 994 days.

(21) Appl. No.: 13/500,339

(22) PCT Filed: Sep. 27, 2010

(86) PCT No.: PCT/FR2010/052025
§ 371 (c)(1),
(2), (4) Date: Apr. 5, 2012

(87) PCT Pub. No.: WO2011/042638
PCT Pub. Date: Apr. 14, 2011

(65) Prior Publication Data
US 2012/0213629 A1    Aug. 23, 2012

(30) Foreign Application Priority Data

Oct. 8, 2009  (FR) ...................................... 09 04816

(51) Int. Cl.
| F01D 25/16 | (2006.01) |
| F16C 27/04 | (2006.01) |
| F16C 19/49 | (2006.01) |
| F16C 27/00 | (2006.01) |
| F16C 19/54 | (2006.01) |

(52) U.S. Cl.
CPC .............. *F16C 27/04* (2013.01); *F01D 25/164* (2013.01); *F05D 2230/64* (2013.01); *F16C 19/49* (2013.01); *F16C 19/545* (2013.01); *F16C 27/00* (2013.01)

(58) Field of Classification Search
CPC ..... F01D 25/16; F01D 25/162; F01D 25/164; F05D 2230/64; F16C 19/49; F16C 19/545; F16C 27/00
USPC .................. 415/119, 229, 230, 231; 416/174; 384/99, 494, 535, 581
See application file for complete search history.

(56) References Cited

U.S. PATENT DOCUMENTS

| 4,429,923 A * | 2/1984 | White et al. ..................... 384/99 |
| 4,971,457 A * | 11/1990 | Carlson ........................... 384/99 |
| 6,240,719 B1 | 6/2001 | Vondrell et al. |
| 8,727,629 B2 * | 5/2014 | Do et al. ........................ 384/494 |
| 9,022,741 B2 * | 5/2015 | Houradou et al. ......... 416/170 R |
| 2003/0039538 A1 * | 2/2003 | Allmon et al. .................... 415/1 |

(Continued)

FOREIGN PATENT DOCUMENTS

| DE | 102 58 528 | 10/2005 |
| EP | 1 008 726 | 6/2000 |
| EP | 1 548 238 | 6/2005 |

OTHER PUBLICATIONS

International Search Report Issued Feb. 7, 2011 in PCT/FR10/52025 Filed Sep. 27, 2010.

*Primary Examiner* — Christopher Verdier

(74) *Attorney, Agent, or Firm* — Oblon, McClelland, Maier & Neustadt, L.L.P.

(57) ABSTRACT

A device for centering and guiding rotation of a turbine engine shaft. The device includes a roller bearing and a ball bearing mounted around the shaft and carried respectively by first and second flexible annular supports, together with an oil film compression damper having a rigid annular support arranged around the roller bearing, the supports of the ball bearing and of the damper, and the roller bearing being stacked transversely, extending one around another.

20 Claims, 3 Drawing Sheets

(56) References Cited

U.S. PATENT DOCUMENTS

| | | |
|---|---|---|
| 2005/0138806 A1 | 6/2005 | Schilling et al. |
| 2006/0045404 A1* | 3/2006 | Allmon et al. ............... 384/581 |
| 2007/0157596 A1* | 7/2007 | Moniz ....................... 60/39.162 |
| 2010/0027930 A1* | 2/2010 | Kinnaird et al. ............. 384/523 |

* cited by examiner

DEVICE FOR CENTERING AND GUIDING THE ROTATION OF A TURBOMACHINE SHAFT

BACKGROUND OF THE INVENTION

1. Field of the Invention

The present invention relates to a device for centering and guiding rotation of a shaft, in particular in a turbine engine.

2. Description of the Related Art

In general, a turbine engine shaft is centered and guided in rotation by two support means, respectively located upstream and downstream, one of the support means possibly comprising two rolling bearings mounted beside each other.

In the art, when a bearing for guiding the shaft has only one rolling bearing, the guide bearing is commonly said to be a "simplex" bearing and is a roller or ball bearing, for example, that is carried by a rigid annular support extending around the shaft.

When a guide bearing has two rolling bearings, the guide bearing is commonly said to be a "duplex" bearing and it generally comprises a roller bearing and a ball bearing.

The ball bearing of the duplex bearing is carried by an annular support possessing a certain amount of flexibility so that it deforms in operation and allows the ball bearing to move off-center in the event of an unbalance, thereby enabling the roller bearing to take up the radial loading.

The roller bearing is carried by an annular support that also preferably presents a certain amount of flexibility in order to avoid dynamic problems. Nevertheless, in order to ensure that the roller bearing can take up the above-mentioned radial loads, the flexibility of the support for the ball bearing must be at least three times greater than the flexibility of the support for the roller bearing.

When both of the bearing supports are flexible, an oil film compression damper is generally arranged around the roller bearing. The damper has an oil-filled annular space that is defined by a portion of the roller bearing support and by a rigid annular element surrounding said portion, the space being closed axially by sealing rings that are free to rotate in annular grooves in the support portion and that co-operate in leaktight manner with an inner cylindrical surface of the rigid annular element.

In the prior art, the supports of the roller bearing and of the ball bearing are arranged one behind the other and they are fastened to each other by nut-and-bolt type means. A device of this type is relatively bulky, in particular in an axial direction, thereby preventing it from being mounted in an engine of small size.

Furthermore, in order to present flexibility, each bearing support includes an annular portion that is elastically deformable. Any increase in the flexibility of a bearing support may in particular result in lengthening the deformable annular portion of the support, thereby nevertheless increasing the axial bulkiness of the device and possibly diminishing the mechanical strength of the deformable portion of the support.

Furthermore, the effectiveness of the oil film compression damper is a function in particular of the ratio of the length of the above-mentioned oil-filled space to its radius. The greater this ratio, the greater the effectiveness of the damping. In other words, it is preferable for this space to be long and to have a radius that is relatively small so as to increase the effectiveness of the damping. Nevertheless, lengthening this space likewise gives rise to an increase in the axial bulkiness of the device.

BRIEF SUMMRY OF THE INVENTION

A particular object of the invention is to provide a simple, effective, and inexpensive solution to the problem of the bulkiness of prior art devices for centering and guidance.

To this end, the invention provides a device for centering and guiding rotation of a turbine engine shaft, the device comprising a roller bearing for mounting around the shaft and carried by a first annular support, a ball bearing for mounting around the shaft and carried by a second annular support, and an oil film compression damper arranged around the roller bearing and including an oil-filled annular space defined by a rigid annular support surrounding a portion of the roller bearing support, the bearing supports being designed to be fastened with the rigid annular support of the damper to a casing, with each of them having an elastically deformable annular portion, the device being characterized in that the ball bearing support, the annular support of the damper, and the roller bearing are stacked transversely, extending around one another.

The device of the invention is relatively compact because of the transverse stacking of the ball bearing support, the annular support of the damper, and the roller bearing. These parts extend one around another, thereby limiting the bulkiness, in particular in an axial direction, of the device, thereby enabling it to be mounted in an engine of smaller size. The invention thus makes it possible to incorporate a flexible-flexible "duplex" bearing (i.e. a device having a roller bearing and a ball bearing carried by respective flexible supports) in an engine of small size, which is not possible in the prior art.

The invention also makes it possible to facilitate determining the amount of flexibility that is required for each support, the ball bearing support possibly presenting flexibility that is more than three times greater than the flexibility of the roller bearing support, while enabling the support to satisfy exceptional mechanical constraints, and also makes it easier to determine the ratio between the length and the radius of the oil film of the damper. In the invention, this ratio is greater than or equal to approximately 0.3 to 0.4.

The rigid annular support of the damper is preferably substantially L-shaped and comprises a cylindrical portion surrounding the roller bearing support and a radial portion for fastening to the casing. The radial portion of the support may be interposed between annular flanges for fastening the supports to the casing.

The deformable portion of each bearing support may include through slots regularly distributed around the axis of the support, the slots defining elastically deformable columns or tongues between one another.

Advantageously, the columns or tongues of the roller bearing support are substantially C-shaped or substantially hairpin-shaped, so as to limit their bulkiness in the axial direction. This particular shape for the columns enables the device to be mounted in the vicinity of a bevel gear on a countershaft of the turbine engine.

These C-shaped columns are designed to deform essentially in a radial direction when transmitting the radial loads taken up by the roller bearing.

The columns or tongues of the ball bearing support may be substantially rectilinear and longitudinally oriented. These columns or tongues are arranged at least in part around the annular support of the damper and their length is determined so as to optimize the flexibility of the ball bearing support. Lengthening these columns or tongues is less penalizing from the point of view of the axial bulkiness of the device than in the prior art, since a major fraction thereof extends around the annular support of the damper.

Preferably, these columns or tongues have at least one end of greater width, thereby making them substantially I-shaped or T-shaped. The enlarged ends of the columns are more rigid than the remainder of the columns and they are therefore better at withstanding the mechanical stresses to which they are subjected in operation, thereby limiting the appearance of cracks in these ends.

According to another characteristic of the invention, the rigid annular support of the damper includes longitudinal reinforcing splines projecting from its outer cylindrical surface and designed, in the assembled position, to be engaged in the above-mentioned slots of the ball bearing support, in order to optimize the stacking of the various parts.

The annular support of the damper may include means for feeding the damper with oil, these means including at least one duct formed in one of the reinforcing splines of the support, for example.

The feed duct may be connected to an endpiece for connection to oil delivery means, the endpiece being designed, in the assembled position, to be engaged in one of the support slots of the roller bearing.

Advantageously, the portion of the roller bearing support that is arranged between the damper and the roller bearing has an I-shaped section and includes an inner cylindrical wall forming the outer ring of the roller bearing and an outer cylindrical wall with annular grooves formed in the outer surface thereof for housing sealing rings of the damper. This particular I-shape serves to stiffen the portion of the support that surrounds the rollers, thereby limiting deformation of this portion in operation and leading to an increase in the lifetime of the roller bearing and to better effectiveness of the oil film compression damper. Stiffening this portion of the roller bearing support serves firstly to prevent this portion being caused to take up a conical shape which would give rise to early and localized wear of the rollers, and secondly to prevent the annular support of the damper being ovalized, which would lead to the thickness of the oil film around the roller bearing no longer being uniform and thus to poor damping of the vibration to which the bearing is subjected in operation.

The support of the ball bearing may be formed integrally with the outer ring of the ball bearing.

The present invention also provides a turbine engine, such as an airplane turboprop or turbojet, including at least one device as described above, the bearing supports and the damper being fastened to an annular flange of an intermediate casing of the turbine engine, this flange being situated in a transverse plane substantially containing the damper and the roller bearing. The flange of the intermediate casing may be an interference fit on the longitudinal reinforcing splines of the annular support of the damper. The radial loads taken up by the roller bearing are thus transmitted directly to the intermediate casing, thereby enabling the lifetime of the parts of the device to be lengthened.

BRIEF DESCRIPTION OF THE SEVERAL VIEWS OF THE DRAWINGS

The invention can be better understood and other characteristics, details, and advantages thereof appear more clearly on reading the following description made by way of non-limiting example and with reference to the accompanying drawings, in which.

DETAIL DESCRIPTION OF THE INVENTION

Figure 1:
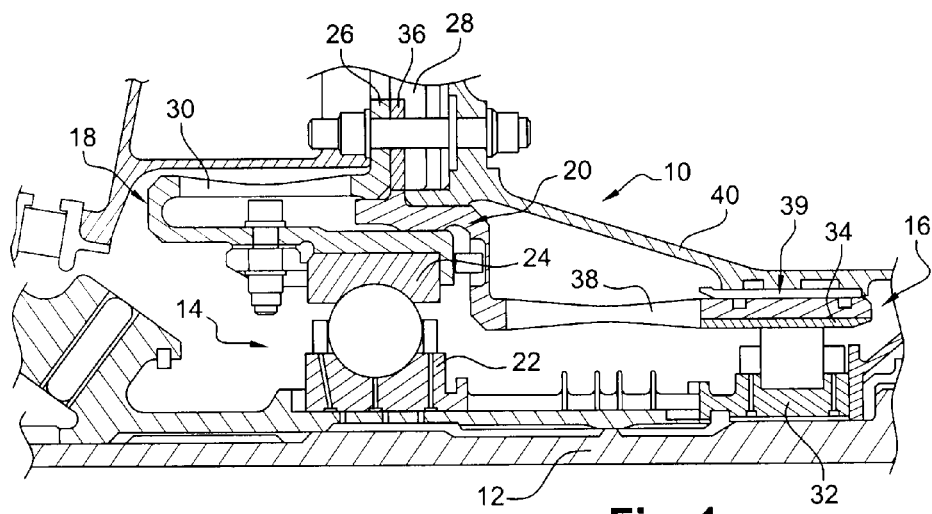
FIG. 1 is a diagrammatic half-view in axial section of a prior art device for centering and guiding rotation of a turbine engine shaft.
Figure 2:
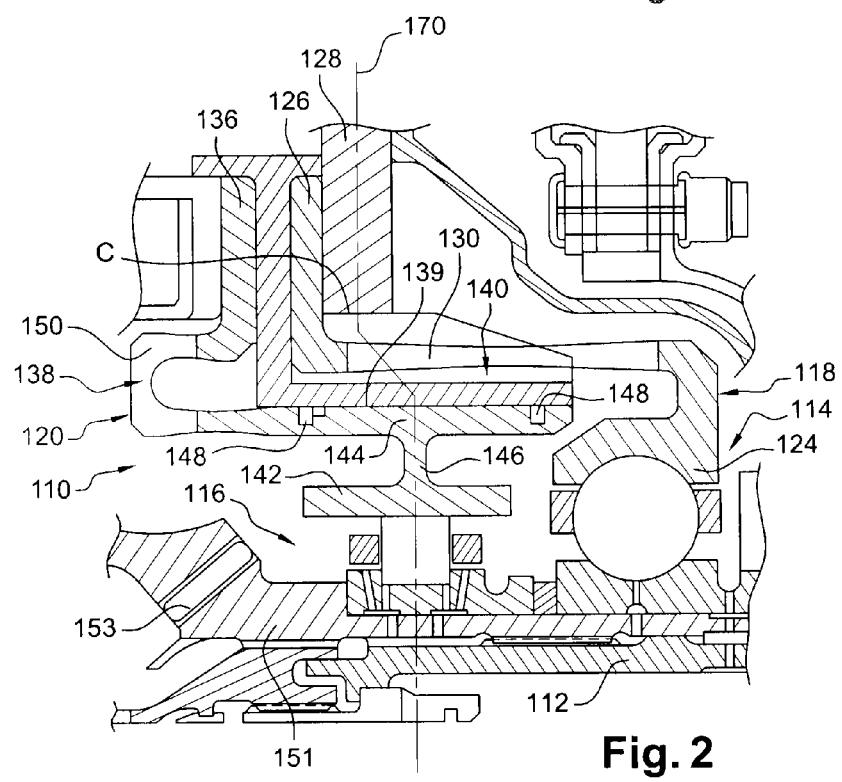
FIG. 2 is a diagrammatic half-view in axial section of a device of the invention for centering and guiding rotation of a turbine engine shaft.

Reference is made to FIG. 1, which shows a prior art device 10 for centering and guiding rotation of a shaft 12 of a high pressure compressor of a turbine engine, the device comprising a ball bearing 14 and a roller bearing 16 mounted around the shaft 12 and carried respectively by two relatively flexible annular supports 18 and 20. In the art, the device 10 is referred to as a flexible-flexible "duplex" bearing.

The ball bearing 14 has a series of balls guided in a raceway defined by an inner ring 22 and an outer ring 24, the inner ring 22 being fastened on the shaft 12 and the outer ring 24 being fastened to one end of the annular support 18 that has, at its other end, an annular flange 26 for fastening to an annular flange 28 of an intermediate casing of the turbine engine. The support 18 has a section that is substantially C-shaped and it includes an elastically deformable annular portion 30 that confers a certain amount of flexibility to the support.

The roller bearing 16 is mounted downstream from the ball bearing 14 and comprises a series of rollers guided in a raceway defined by an inner ring 32 and an outer ring 34, the inner ring 32 being fastened on the shaft 12 and the outer ring being fastened to a downstream end of the annular support 20 that has an annular flange 36 at its upstream end for fastening to the flange 28 of the intermediate casing. This support 20 is substantially cylindrical in shape and has an elastically deformable annular portion 38 conferring a certain amount of flexibility to the support. A major portion of the support 20 extends downstream from the support 18.

The device 10 also includes a damper 39 that operates by compressing a film of oil, the damper having an oil-filled annular space that is defined by the downstream end portion of the support 20 and by the downstream end portion of a rigid annular support 40 that extends around the support 20 and that is fastened via its upstream end to the flange 28.

This device 10 is relatively bulky in the axial direction and it can be difficult or even impossible to incorporate in an engine of small size.

The invention provides a solution to this problem by transversely stacking the ball bearing support, the oil film compressor damper support, and the roller bearing so that they extend around one another.

In the embodiment of the invention shown in FIGS. 2 to 9, the device 110 comprises a roller bearing 116 mounted upstream from a ball bearing 114, the roller bearing 116 being mounted around the shaft 112 and carried by an annular support 120 that is surrounded by the rigid annular support 140 of the damper. The ball bearing 114 is mounted around the shaft 112 and is carried by an annular support 118 surrounding the support 140.

The support 120 of the roller bearing 116 (FIGS. 2 to 7) includes an annular portion of I-section that is connected by an elastically deformable annular portion 138 to an annular fastener flange 136 extending radially outwards.

The I-section portion of the support 120 has two cylindrical walls, respectively an inner wall 142 and an outer wall 144, extending one inside the other and connected together by a radial annular wall 146.

The inner cylindrical wall 142 forms the outer ring of the roller bearing 116 that has its inner ring 132 fastened on the shaft 112. The outer wall 144 has an outer cylindrical surface defining the inside of the oil-filled annular space of the oil film compression damper 139.

The damper 139 is closed axially at its upstream and downstream ends by two sealing rings 148 that are mounted free to rotate in outer annular grooves in the outer surface of the wall 144.

Figure 3:
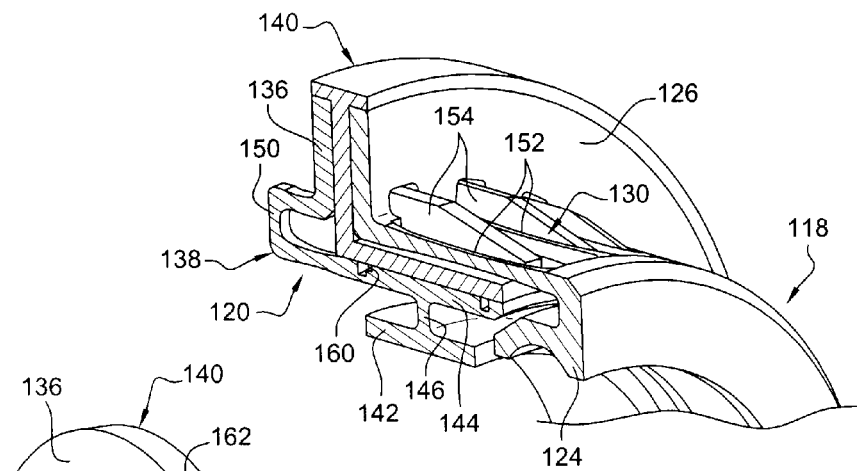
FIG. 3 is a fragmentary diagrammatic view in perspective and in axial section showing the FIG. 2 device on a larger scale, in which there can be seen the first and second bearing supports and the annular support or the oil film compression damper.
Figure 4:
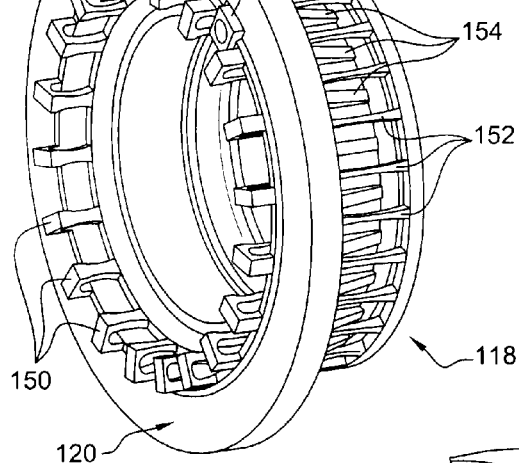
FIG. 4 is a diagrammatic view in perspective of the FIG. 2 device, seen from upstream and from the side.

The deformable portion 138 of the support 118, that can be seen more clearly in FIGS. 3 and 4, presents a section that is substantially C-shaped or hairpin-shaped and it includes a plurality of through slots that between them define C-shaped columns or tongues 150. These columns or tongues 150 are regularly distributed around the axis of the support 118 and they are deformable, in particular in a radial direction.

This C-shape of the columns 150 allows the device to be mounted around a countershaft 151 mounted on the shaft 112 and having a bevel gear 153 at its upstream end. The columns 150 in this example extend around the gear 153 and they are spaced apart therefrom.

The support 118 of the ball bearing 114 (FIGS. 2 to 6 and 9) is made integrally with the outer ring 124 of the bearing and has a deformable annular portion 130 connected at its downstream end to the ring 124 and at its upstream end to an annular flange 126 for fastening to the flange 136 of the other support 120.

Figure 9:
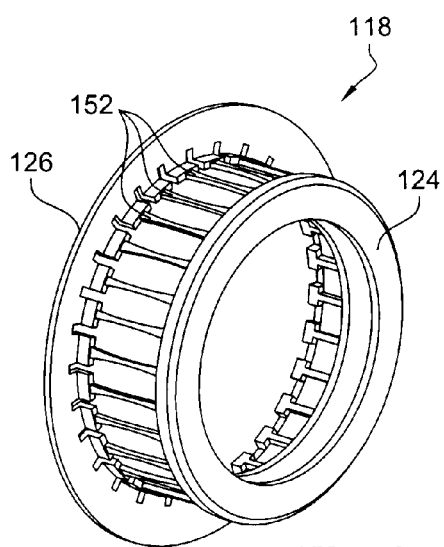
FIG. 9 is a diagrammatic view in perspective of the second bearing support of the FIG. 2 device.

The deformable portion 130 of the support 118, more clearly visible in FIGS. 3 and 9, includes a plurality of through slots that between them define rectilinear and longitudinal columns or tongues 152, which columns or tongues are elastically deformable in an axial and/or radial direction. These columns or tongues 152 are regularly distributed around the longitudinal axis of the support 118. These columns or tongues 152 may have at least one end of greater width, and may further be substantially I-shaped as shown in FIG. 4, or substantially T-shaped as shown in Figs. 9.

The inner surfaces of the wall 142 of the support 120 and of the inner ring 124 of the support 118 are preferably covered in a thin layer of a hard material for limiting the wear of these parts as a result of friction against the balls and the rollers of the bearings.

The support 140 (FIGS. 2 to 6 and 8) is L-shaped, having a cylindrical portion connected at its upstream end to an outwardly-extending radial portion. The radial portion of the support 140 is interposed between the flanges 136 and 126 of the bearing support, with these parts being pressed and fastened together by nut-and-bolt type means against an annular flange 128 of an intermediate casing.

The cylindrical portion of the support 140 extends around the I-shaped portion of the support 120 and its inner surface defines the outside of the above-mentioned oil-filled annular space of the damper 139. The rings 148 co-operate with the inner cylindrical surface of this cylindrical portion of the support 140 in order to seal this space.

Figure 6:
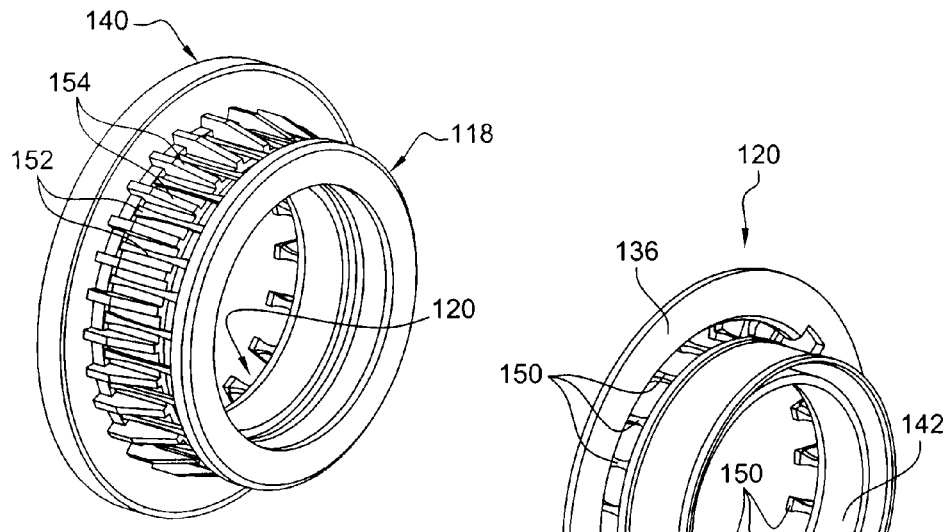
FIG. 6 is another diagrammatic view in perspective of the FIG. 2 device, seen from downstream and from the side.
Figure 7:
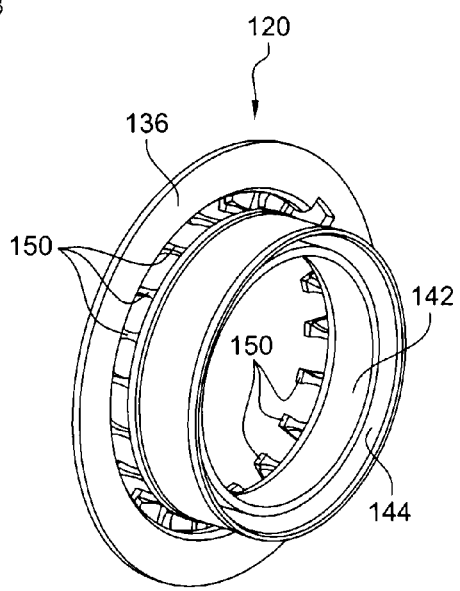
FIG. 7 is a diagrammatic view in perspective of the first bearing support of the FIG. 2 device.
Figure 8:
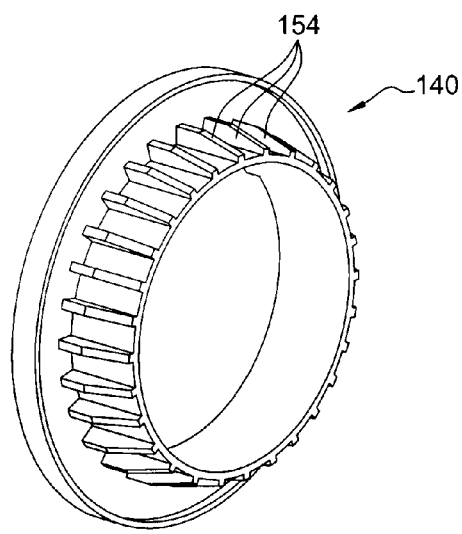
FIG. 8 is a diagrammatic view in perspective of the annular support of the damper of the FIG. 2 device.

Longitudinal reinforcing splines 154 project from the outer surface of the cylindrical portion of the support 140. As can be seen in FIGS. 3 and 6, these splines are designed, when in the assembled position, to be engaged in the slots of the deformable portion 130 of the support 118. Each spline 154 of the support 140 thus extends between two adjacent columns or tongues 152 of the support 118.

Figure 5:
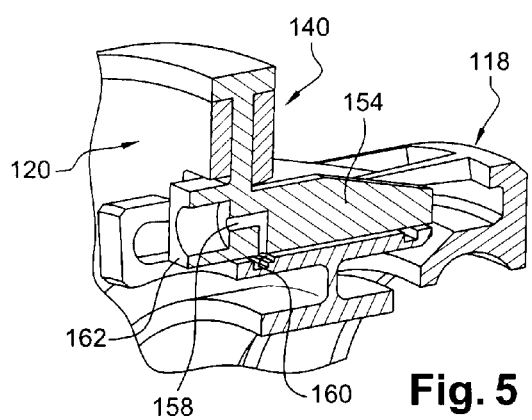
FIG. 5 is a fragmentary diagrammatic view in perspective and in axial section of the FIG. 2 device, the section passing through the means for feeding the damper with oil.

The support 140 includes means for feeding the damper 139 with oil, these means comprising an oil duct 158 that is formed in one of the splines 154 of the support 140 and that leads at a first end to the inner surface of the cylindrical support 140 (FIG. 5). The second end of the duct 158 is connected to an endpiece 162 for coupling to oil delivery means, the endpiece 162 projecting from the upstream face of the radial portion of the support 140 and extending, in the assembled position, between two adjacent columns 150 of the support 120 (FIGS. 4 and 5). The oil duct 158 in this example is substantially L-shaped.

Between the above-mentioned sealing rings 148, the outer surface of the wall 144 of the support 120 has an annular groove 160 for distributing the oil delivered by the duct 158. This groove 160 is situated substantially in register with the duct and enables the oil to be distributed uniformly over the entire periphery of the damper, thereby forming an oil film that is of uniform thickness (FIG. 5). The operation of this type of damper is well known in the art and is therefore not explained in greater detail herein.

In operation, the portion 130 of the support 118 deforms to allow the ball bearing 114 to move off-center, e.g. under the effect of an unbalance. The roller bearing 116 is then designed to take up the radial loads caused by the unbalance, which loads are then transmitted by the support 120 to the intermediate casing.

The flange 128 of the intermediate casing is advantageously an interference fit at C (FIG. 2) on the reinforcing splines 154 of the support 140, so as to ensure that these radial loads are properly transmitted. The flange 128 of the intermediate casing in this example is situated in a transverse plane substantially containing the damper 140 and the roller bearing 116 (see the force-transmission line 170 drawn diagrammatically as a chain-dotted line), thereby enabling the above-mentioned loads to be transmitted effectively directly to the intermediate casing without excessively stressing the parts of the device. The damper 139 is designed to damp the vibration to which the roller bearing 116 is subjected in operation.

The invention claimed is:

1. A device for centering and guiding rotation of a turbine engine shaft having an axis, the device comprising:
   a roller bearing axially mounted around the shaft and carried by a first annular support;
   a ball bearing axially mounted around the shaft and carried by a second annular support; and
   an oil film compression damper axially arranged around the roller bearing and including an oil-filled annular space defined by a rigid annular support surrounding a portion of the first annular support,
   the first annular support and second annular support configured to be fastened with the annular support of the damper to a casing of the turbine engine, with each of the first annular support and second annular support including an elastically deformable annular portion,
   wherein the second annular support and the rigid annulars support surround the roller bearing.

2. A device according to claim 1, wherein the annular support of the damper is substantially L-shaped and comprises a cylindrical portion surrounding the first annular support and a radial portion for fastening to the casing.

3. A device according to claim 1, wherein the deformable portion of each bearing support includes through slots regularly distributed axially around the first annular support and the second annular support, the slots defining elastically deformable columns or tongues between one another.

4. A device according to claim 3, wherein the columns or tongues of the first annular support are substantially C-shaped or substantially hairpin-shaped.

5. A device according to claim 3, wherein the columns or tongues of the second annular support are substantially rectilinear and longitudinally oriented.

6. A device according to claim 5, wherein the columns or tongues of the second annular support have at least one end of greater width, and are substantially T-shaped or I-shaped.

7. A device according to claim 3, wherein the annular support of the damper includes longitudinal reinforcing splines projecting from an outer cylindrical surface thereof and configured, in the assembled position, to be engaged in slots of the second annular support.

8. A device according to claim 7, wherein the annular support of the damper includes means for feeding the damper with oil, including at least one duct formed in one of the reinforcing splines of the support.

9. A device according to claim 8, wherein the duct is connected to an endpiece for connection to oil delivery means, the endpiece projecting from a radial face of the support of the damper and configured, in the assembled position, to be engaged in one of the slots of the first annular support.

10. A device according to claim 1, wherein a portion of the first annular support that is arranged between the damper and the roller bearing has an I-shaped section and includes an inner cylindrical wall forming an outer ring of the roller bearing and an outer cylindrical wall with annular grooves formed in an outer surface thereof for housing sealing rings of the damper.

11. A device according to claim 1, wherein the second annular support is formed integrally with an outer ring of the ball bearing.

12. A turbine engine, or an airplane turboprop or turbojet, comprising:
at least one device according to claim 1,
wherein the first annular support and the second annular support and the damper are fasten to an annular flange of the casing of the turbine engine, the annular flange being situated in a plane transverse to said axis, essentially containing the damper and the roller bearing.

13. A turbine engine according to claim 12, wherein the flange of the casing is an interference fit on longitudinal reinforcing splines of the annular support of the damper.

14. A device according to claim 1, wherein the second annular support surrounds the rigid annular support which surrounds the roller bearing.

15. A device for centering and guiding rotation of a turbine engine shaft having an axis, the device comprising:
a roller bearing axially mounted around the shaft and carried by a first annular support;
a bail bearing axially mounted around the shaft and carried by a second annular support; and
an oil film compression damper axially arranged around the roller bearing and including an oil-filled annular space defined by a rigid annular support surrounding a portion of the first annular support,
the first annular support and second annular support configured to be fastened with the annular support of the damper to a casing, with each of the first annular support and second annular support including an elastically deformable annular portion,
wherein the second annular support, the rigid annular support of the damper, and the roller bearing are stacked around one another transversely to said axis, so that the second annular support and the rigid annular support surround the tier bearing,
wherein the deformable portion of each bearing support includes through slots regularly distributed around the first annular support and second annular support, the slots defining elastically deformable columns or tongues between one another, and
wherein the annular support of the damper includes longitudinal reinforcing splines projecting from an outer cylindrical surface thereof and configured, in the assembled position, to be engaged in slots of the second annular support.

16. A device according to claim 15, wherein the annular support of the damper includes means for feeding the damper with oil including at least one duct formed in one of reinforcing splines of the support.

17. A device according to claim 15, wherein the second annular support surrounds the rigid annular support which surrounds the roller bearing.

18. A turbine engine, or an airplane turboprop or turbojet, comprising:
at least one device for centering and guiding rotation of a turbine engine shaft having an axis, the device comprising:
a roller bearing axially mounted around the shaft and carried by a first annular support;
a ball bearing axially mounted around the shaft and carried by a second annular support; and
an oil film compression damper axially arranged around the roller bearing and including an oil-filled annular space defined by a rigid annular support surrounding a portion of the first annular support,
the first annular support and second annular support being configured to be fastened with the annular support of the damper to a casing of the turbine engine, with each of the first annular support and second annular support including an elastically deformable annular portion,
wherein the second annular support, the rigid annular support of the damper, and the roller bearing are stacked around one another transversely to said axis, so that the second annular support and the rigid annular support surround the roller bearing,
wherein the bearing supports and the damper are fastened to an annular flange of said casing of the turbine engine, the flange being situated in a plane transverse to said axis, substantially containing the damper and the roller bearing, and
wherein the flange of said casing is an interference fit on longitudinal reinforcing splines of the annular support of the damper.

19. A device for centering and guiding rotation of a turbine engine shaft having an axis, the device comprising:
a roller bearing axially mounted around the shaft and carried by a first annular support;
a ball bearing axially mounted around the shaft and carried by a second annular support; and
an oil film compression damper axially arranged around the roller bearing and including an oil-filled annular space defined by a rigid annular support surrounding a portion of the first annular support, the first annular support and second annular support being configured to be fastened with the annular support of the damper to a casing of a turbine engine, with each of the first annular support and second annular support including an elastically deformable annular portion, wherein the first annular support is fixed through the elastically deformable annular portion to a fastener flange, and wherein the fastener flange, the roller bearing and the ball bearing are successively axially mounted around the shaft.

20. A turbine engine, or an airplane turboprop or turbojet according to claim 19, wherein the second annular support and the rigid annular support surround the roller bearing.

\* \* \* \* \*